Nov. 4, 1969   D. D. SHERRILL   3,476,288
GUARD COVER FOR VALVE HANDWHEELS
Filed March 27, 1968
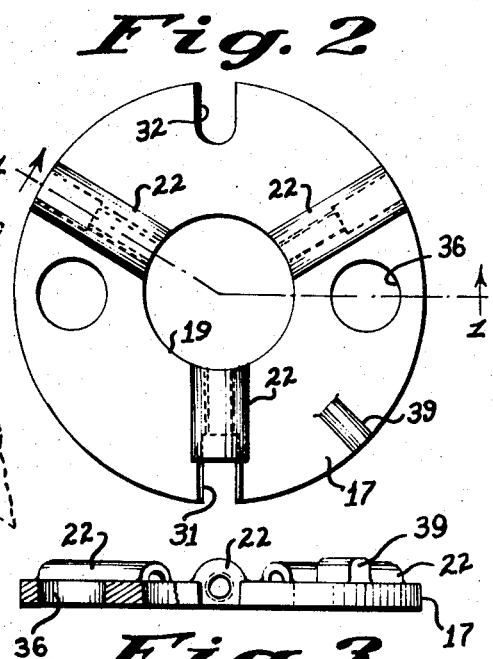
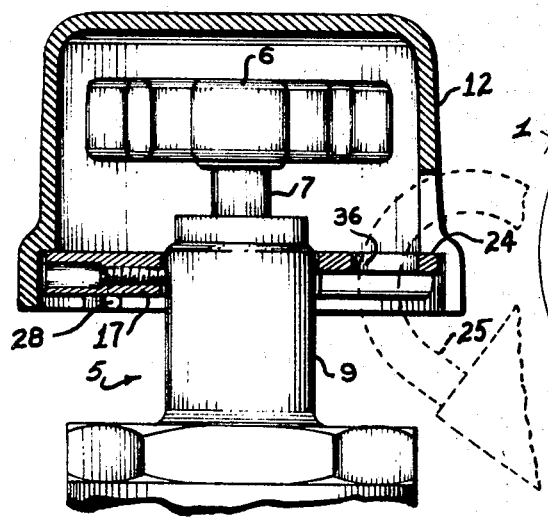
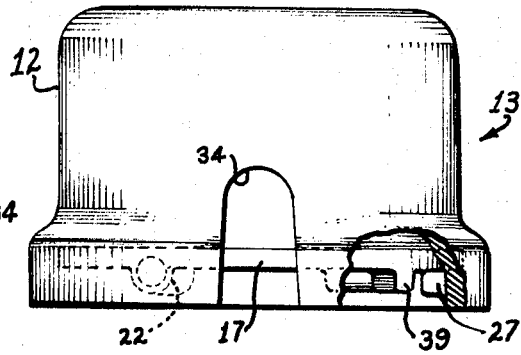
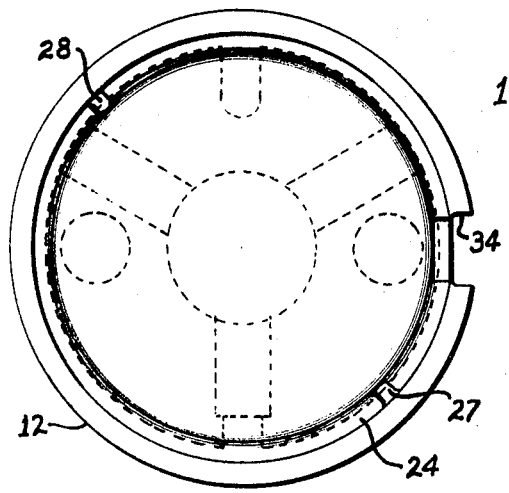
INVENTOR
DANA D. SHERRILL
BY
ATTORNEY 3,476,288
GUARD COVER FOR VALVE HANDWHEELS
Dana D. Sherrill, 1011 Sun Drive,
Colorado Springs, Colo. 80906
Filed Mar. 27, 1968, Ser. No. 716,451
Int. Cl. B65d 25/38
U.S. Cl. 220—85                                    1 Claim

ABSTRACT OF THE DISCLOSURE

A valve cover which includes an annular ring having radial screw means to attach the same to a valve bonnet and having a cup-shaped hood which fits onto the ring and over the handwheel and includes studs inwardly projecting from the inside of the hood and which are disposed below the annular ring to prevent removal of the latter.

---

The present invention relates to a cover for valve handwheels and more particularly to a cover which can easily be locked in place to prevent accidental or unauthorized operation of the valve.

The primary object of the invention is to provide a universal protective cover for a valve which may quickly be applied to any standard valve assembly without the disassembly of the valve.

A preferred form of the invention will be described in detail in conjunction with the attached drawings in which:

FIGURE 1 is a fragmentary view of a typical valve showing the valve cover of the present invention in cross section, which cross section is taken along lines 1—1 of FIGURE 2. A fragmentary portion of a padlock is shown in phantom.

FIGURE 2 is a bottom view of the annular base ring of the valve cover.

FIGURE 3 is a side elevational view of the base ring with a portion thereof broken away.

FIGURE 4 is a bottom view of the valve cover hood showing the base ring in phantom to illustrate the relative position of the cover hood and base ring.

FIGURE 5 is a side elevational view of the valve cover with a portion of the hood broken away.

A typical valve assembly 5 is partially illustrated in FIGURE 1 which depicts a valve handwheel 6 attached to a valve stem 7 rotatable within the bonnet 9. The body portion or hood 12 of the valve cover device 13 is generally cup-shaped and adapted to enclose the handwheel 6 of the valve 5.

In order to secure the hood 12 onto the valve to avoid unauthorized removal thereof, an annular base ring 17 is provided with a central aperture 19 sized to receive the valve bonnet 9. Temporary removal of the valve handle 6 will allow the ring 17 to be placed on the valve, as shown in FIGURE 1. Set screws are disposed in three radially equispaced threaded bores 22 on the ring 17 in order to fasten the latter to the bonnet 9.

After the base ring has been secured to the valve bonnet 9, the cover hood 12 may be applied and locked in place by means of a padlock 25 or similar device. The cover hood 12 is maintained on the base ring by a pair of diametrically opposed studs 27 and 28 protruding radially inwardly from the inside surface of the cover 12 and which are adapted to be normally positioned below the base plate 17. When placing the hood 12 onto the base ring, the studs 27 and 28 are inserted through diametrically opposed slot opening 31 and 32 in the base ring and the hood is then rotated approximately 45° to bring the side opening 34 in the hood 12 into opposing alignment with an opening 36 in the plate 17. A protruding stop 39 provided on the bottom side of the base plate 17 assists in positioning the hood by its interference with the travel of the studs 27 or 28. Once the hood is rotated to a point where the studs are beneath the ring, the studs prevent the hood from being lifted vertically and removed. To maintain the hood in an elevated position above the handwheel 6, a circumferential shoulder 24 is formed around the inside surface of the hood. The shoulder 24 rests on the top surface of the ring 17 and provides support for the hood.

Having understood the details of construction of the valve cover of the present invention, it will be apparent that the construction of the device provides a simple and expedient solution to the objects of the invention. It will also be noted that the skirt portion of the hood 12 adequately shields the set screws which hold the base plate to the valve so as to prevent removal of the base plate without first removing the hood 12.

Having thus described the several useful and novel features of the guard cover for valve handwheels of the present invention in connection with the accompanying drawings, it will be seen that the many worthwhile objectives for which it was designed have been achieved.

I claim:
1. A valve cover assembly comprising an annular ring member having:
   at least one threaded radially disposed bore for receiving a set screw,
   at least one peripheral slot, and
   at least one aperture in the ring which is spaced angularly from the said peripheral slot;
   a cup shaped hood covering said annular ring member and having an opening in one side thereof, and
   at least one radially inwardly extending stud projecting from the inside surface of said hood in proximity to the said opening therein and disposed to lie beneath the annular ring; and
   locking means interconnecting the said aperture in the ring and the opening in the side of the cup-shaped hood.

References Cited

UNITED STATES PATENTS

| | | | |
|---|---|---|---|
| 1,948,953 | 2/1934 | Wayer et al. | |
| 2,029,955 | 2/1936 | Taylor | 137—382 |
| 2,593,533 | 4/1952 | Cammarato. | |
| 2,684,779 | 7/1954 | Rafferty | 220—40 |

RAPHAEL H. SCHWARTZ, Primary Examiner